US008160811B2

(12) United States Patent
Prokhorov

(10) Patent No.: US 8,160,811 B2
(45) Date of Patent: Apr. 17, 2012

(54) METHOD AND SYSTEM TO ESTIMATE DRIVING RISK BASED ON A HIERARCHICAL INDEX OF DRIVING

(75) Inventor: Danil V. Prokhorov, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 884 days.

(21) Appl. No.: 12/146,806

(22) Filed: Jun. 26, 2008

(65) Prior Publication Data

US 2009/0326796 A1 Dec. 31, 2009

(51) Int. Cl.
*G06F 19/00* (2006.01)

(52) U.S. Cl. .......................... 701/300; 700/711; 700/741

(58) Field of Classification Search .................. 701/200, 701/300; 707/711, 741; *G06F 19/00*
See application file for complete search history.

(56) References Cited

U.S. PATENT DOCUMENTS

| | | | | |
|---|---|---|---|---|
| 6,035,253 | A * | 3/2000 | Hayashi et al. | 701/211 |
| 6,044,321 | A * | 3/2000 | Nakamura et al. | 701/96 |
| 6,405,132 | B1 | 6/2002 | Breed et al. | |
| 6,446,998 | B1 * | 9/2002 | Koenig et al. | 280/432 |
| 6,564,123 | B2 * | 5/2003 | Hahn et al. | 701/1 |
| 6,624,782 | B2 | 9/2003 | Jocoy et al. | |
| 6,720,920 | B2 | 4/2004 | Breed et al. | |
| 7,034,668 | B2 | 4/2006 | Engelman et al. | |
| 7,069,146 | B2 | 6/2006 | Yamamura et al. | |
| 7,124,027 | B1 | 10/2006 | Ernst, Jr. et al. | |
| 7,139,750 | B2 * | 11/2006 | Lin et al. | 707/3 |
| 7,145,441 | B2 | 12/2006 | Knoop et al. | |
| 7,206,673 | B2 | 4/2007 | Yamamura et al. | |
| 7,292,940 | B2 * | 11/2007 | Isogai et al. | 701/301 |
| 7,317,406 | B2 * | 1/2008 | Wolterman | 340/917 |
| 7,463,138 | B2 * | 12/2008 | Pawlicki et al. | 340/435 |
| 7,634,452 | B2 * | 12/2009 | Adachi et al. | 706/46 |
| 7,707,214 | B2 * | 4/2010 | Monro | 707/737 |
| 7,711,726 | B2 * | 5/2010 | Iijima et al. | 707/711 |
| 7,769,781 | B1 * | 8/2010 | Huntley | 707/791 |
| 7,813,844 | B2 * | 10/2010 | Gensler et al. | 701/1 |
| 7,852,462 | B2 * | 12/2010 | Breed et al. | 356/4.01 |
| 2004/0061598 | A1 * | 4/2004 | King | 340/435 |
| 2005/0038573 | A1 | 2/2005 | Goudy | |

(Continued)

OTHER PUBLICATIONS

Ward, D., Bertram, T., Hiller, M., "Vehicle dynamics simulation for the development of an extended adaptive cruise control", Advanced Intelligent Mechatronics, 1999. Proceedings. 1999 IEEE/ASME International Conference on, Digital Object Identifier: 10.1109/AIM.1999.803258 , Publication Year: 1999 , pp. 730-735.*

*Primary Examiner* — Tuan C. To
(74) *Attorney, Agent, or Firm* — Gifford, Krass, Sprinkle, Anderson & Citkowski, P.C.

(57) ABSTRACT

A system and method for providing driving risk assessment for a host vehicle equipped with on-board sensors or vehicle-to-vehicle or infrastructure-to-vehicle systems. The system includes a hierarchical index of passive driving conditions, a means of collecting active driving conditions and a processor whereby the sum of passive driving conditions may be further refined by the active driving conditions. The method incorporates a hierarchical index of risks associated with passive driving conditions, and refining said risks with active driving conditions of the vehicle to generating a driving risk assessment for current vehicle operation.

10 Claims, 5 Drawing Sheets

U.S. PATENT DOCUMENTS

| | | | | |
|---|---|---|---|---|
| 2005/0225477 | A1 * | 10/2005 | Cong et al. | 342/70 |
| 2006/0142917 | A1 * | 6/2006 | Goudy | 701/45 |
| 2007/0021915 | A1 | 1/2007 | Breed et al. | |
| 2007/0038336 | A1 | 2/2007 | Yamamura et al. | |
| 2007/0152804 | A1 | 7/2007 | Breed et al. | |
| 2007/0198136 | A1 | 8/2007 | Kobayashi et al. | |
| 2007/0216521 | A1 * | 9/2007 | Guensler et al. | 340/439 |
| 2007/0288133 | A1 * | 12/2007 | Nishira et al. | 701/23 |
| 2007/0299612 | A1 * | 12/2007 | Kimura et al. | 701/301 |
| 2008/0004806 | A1 * | 1/2008 | Kimura et al. | 701/301 |
| 2010/0063736 | A1 * | 3/2010 | Hoetzer | 701/301 |

* cited by examiner

METHOD AND SYSTEM TO ESTIMATE DRIVING RISK BASED ON A HIERARCHICAL INDEX OF DRIVING

BACKGROUND OF THE INVENTION

1. Field of the Invention

A system and method for providing driving risk assessment to an operator of a vehicle equipped with on-board sensors or vehicle-to-vehicle (V-2-V) or infrastructure-to-vehicle (I-2-V) systems using a hierarchical index of passive driving conditions and active driving conditions.

2. Description of the Prior Art

Methods and systems for generating driving risk assessment are known. U.S. Pat. No. 7,124,027 to Ernst et al. teaches a collision avoidance system having sensors for obtaining radar measurements detecting objects external to the vehicle, an identification module for storing attributes associated with a user of the vehicle, environmental conditions, and roadway, as well as a means for providing threat assessment based upon the radar measurements and selected attributes. However, Ernst et al does not teach the placement of external attributes and environmental conditions in a hierarchical index and assigning a risk factor to each attribute.

U.S. Patent Application Publication No. 2005/0038573 to Goudy discloses the use of risk analysis summation for determining when to disable entertainment devices. The disclosure teaches updating the risk level on the basis of information learned from previous experience. However, Goudy does not teach the use of external environmental conditions in conjunction with information learned from previous experience to provide a risk assessment for current vehicle operations.

Accordingly, it is desirable to have a system and method for providing a driving risk assessment that provides accurate and timely risk assessment based not only upon driver information, roadway orientation, but also the operating conditions of other vehicles within a predetermined area, current weather and roadway conditions. It is also desirable that certain environmental conditions be placed in a hierarchical order as this decreases process time and increases process reliability thereby fierier assuring that driving risk assessment is provided in a timely manner.

SUMMARY OF THE INVENTION AND ADVANTAGES

A system and method for providing driving risk assessment to an operator of a vehicle equipped with on-board sensors or vehicle-to-vehicle or infrastructure-to-vehicle networks. The system includes a hierarchical index of passive driving conditions, a means of collecting active driving conditions and a processor whereby the sum of passive driving conditions may be further refined by the active driving conditions. The method incorporates a hierarchical index of risks associated with passive driving conditions, and refining said risks with active driving conditions of the vehicle to generate a driving risk assessment for current vehicle operation.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
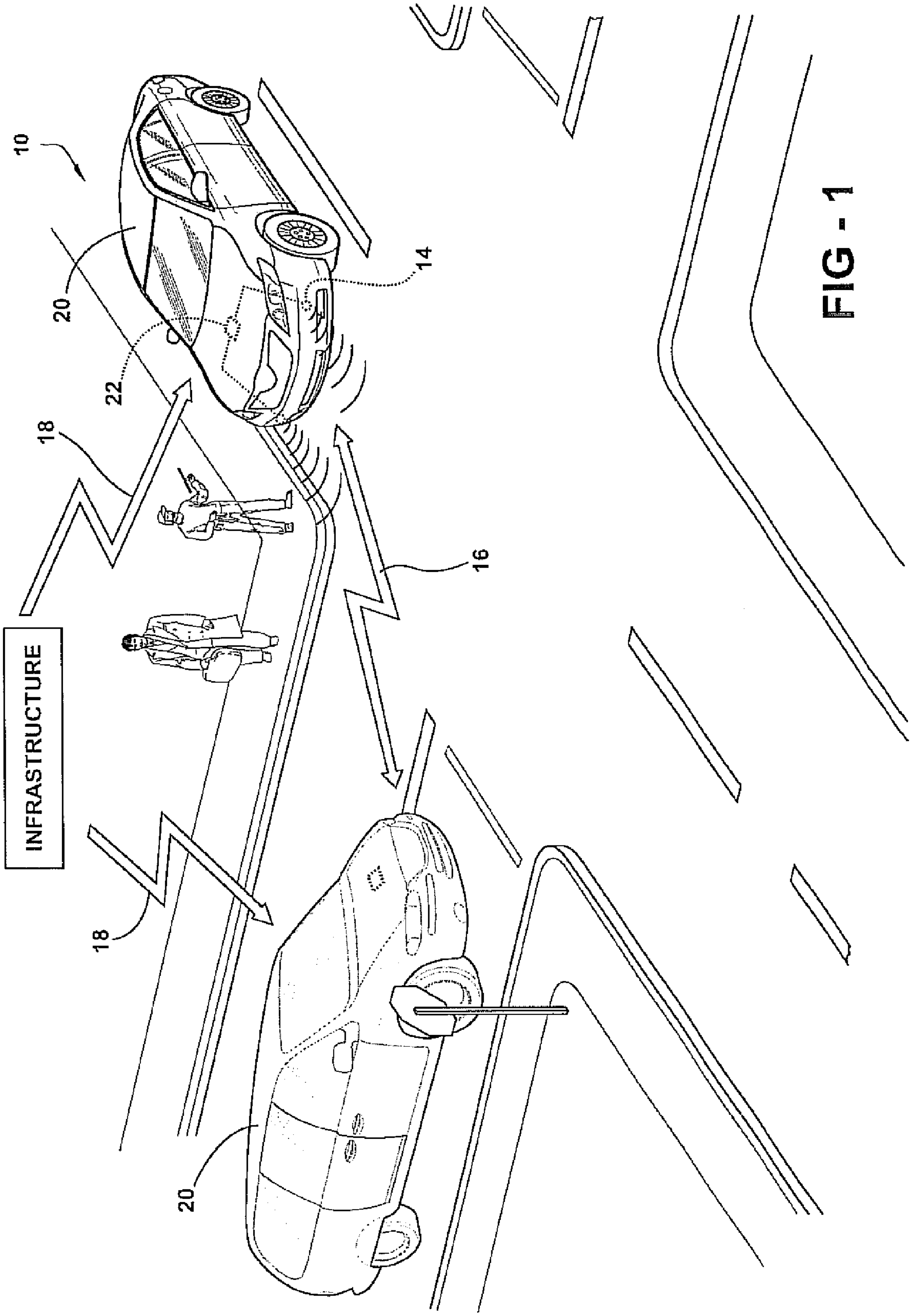
FIG. 1 is perspective view of the preferred embodiment of a system for generating a driving risk assessment using a hierarchical index of passive driving conditions and active driving conditions, as shown the active driving conditions may be obtained using on-board sensors such as radar, or from an external feed such as a vehicle-to-vehicle network, or infrastructure-to-vehicle network.

Referring to the Figures a system 10 and method 12 for providing driving risk assessment to an operator of a vehicle equipped with on-board sensors 14, vehicle-to-vehicle network 16 or infrastructure-to-vehicle network 18 is provided. With reference now to FIG. 1 the system 10 includes a host vehicle 20 equipped with computer processing unit (CPU) 22 storing a hierarchical index 24 (FIG. 3) of passive driving conditions, and a means for obtaining information relating to current driving conditions. The system categorizes the obtained driving conditions into passive and active conditions. The passive driving conditions are each assigned a predetermined first risk factor, and each active driving condition is assigned a second risk factor. The CPU 22 provides a driving risk assessment to the operator of a vehicle by executing a programmable code/software which identifies each of the passive driving conditions applicable to the operation of the host vehicle 20 and refines the sum total of said passive driving conditions with the active driving conditions detected.

The CPU 22 is in communication with a means for detecting and obtaining information regarding active driving conditions, such as a vehicle-to-vehicle network 16, on-board sensors 14 such as radar, video camera, or the like, or infrastructure-to-vehicle network 18. For instance, information regarding the speed and direction of other vehicles within a predetermined area of the host vehicle 20 is obtained and used to further refine the passive driving conditions from the hierarchical index 24 applicable to the current operation of the vehicle. If the host vehicle 20 is equipped with vehicle-to-vehicle network 16 capabilities, then active driving conditions may be transmitted to the host vehicle 20 from other vehicles similarly equipped. Alternatively, the host vehicle 20 may obtain active driving conditions from on-board sensors 14 such as radar, or camera devices whereby the information obtained from the on-board sensors 14 are processed to provide the host vehicle 20 with active driving conditions. Otherwise, the host vehicle 20 can be equipped with an infrastructure-to-vehicle network 18 to obtain the active driving conditions. Thus the system 10 uses both passive driving conditions and active driving conditions to provide the driver with a driving risk assessment related to the current operation of the vehicle. The method 12 by which the driving risk assessment is provided is discussed in greater detail below.

Figure 2:
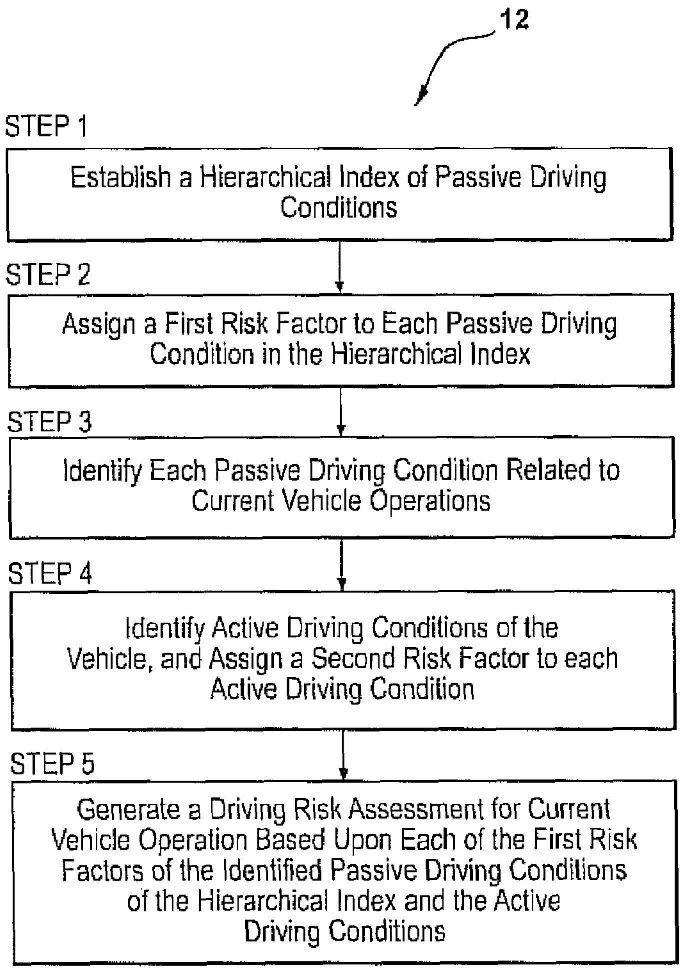
FIG. 2 is a diagram illustrating the steps in a method of providing driving risk assessment based upon a hierarchical index and active driving conditions.

With reference now to FIG. 2, the steps in a method 12 of providing driving risk assessment is shown. The method 12 includes the steps of establishing a hierarchical index 24 of passive driving conditions and further refining applicable passive driving conditions with active driving conditions to produce a driving risk assessment. The driving risk assessment may be incorporated into an autonomously driven vehicle to provide for the safe operation thereof.

The hierarchical index 24 of the risk of passive driving conditions may be stored in the host vehicle's CPU 22 or retrieved from an external database accessible by the host vehicle's computer system 10. The hierarchical index 24 may include of prior knowledge regarding passive driving conditions. The term passive driving condition as used herein refers to either driving factors that cannot be changed by the vehicle operator such as the environmental conditions like weather and visibility; the street scenes and its associated components such as street lights, and street signs; and the driver's intended course of action such as making a left turn, stopping, accelerating or the like. These passive driving conditions may be gathered from prior knowledge, for example, maps with associated street scenes may be integrated into the system 10, whereby the database not only includes the road, but also whether a street light or stop sign is present at any given intersection, or the visibility at an intersection. Historical data regarding roadways may also be compiled in the hierarchical index 24, for instance, the traffic density of a particular roadway at a particular time, the level of construction activity, the amount of pedestrian activity at a particular time, and the like.

The passive driving conditions are indexed in a hierarchical order and each is assigned a first risk factor. The first risk factor may be a scaled value (gradual value in some range) or binary. Many methods 12 are available to calculate a first risk factor for a particular passive driving condition. For example, a scaled risk factor may be calculated using an inference process including fuzzy logic, or alternatively crisp logic may be used whereby the first risk factor is any monotone increasing function of the argument, e.g., the traffic density. The scale may be set by the operator or may be predetermined. For illustrative purposes and in no terms limiting, suppose the scaled first risk factor, generated using any known method 12 of calculation, is scaled from "0" to "1" with "1" being the highest risk factor. A vehicle travelling a roadway at rush hour may be assigned a risk factor of "0.8" whereas the vehicle travelling that same roadway during a time when traffic is historically at its lowest congestion is given a risk factor of "0.1" and traffic density between rush hour and the time of lowest congestion is given a risk factor of "0.5". When assigning a binary risk first risk factor, the vehicle travelling said roadway may be assigned a first risk factor of "0" when the roadway is being travelled during a time when historically the roadway has the lowest traffic density, and assigned a first risk factor of "1" at any other time.

The first risk factor of passive driving conditions may be further influenced by knowledge gathered from literature written by expert drivers and government testing results such as test results from professional drivers regarding the risks presented in certain driving maneuvers, or the operation of a vehicle under certain circumstances. For example, the opinion of professional drivers regarding danger of making a turn at a certain speed, or the risk of making a left turn at an intersection with limited visibility may be used to influence the value of the first risk factor assigned to such conditions.

Figure 3:
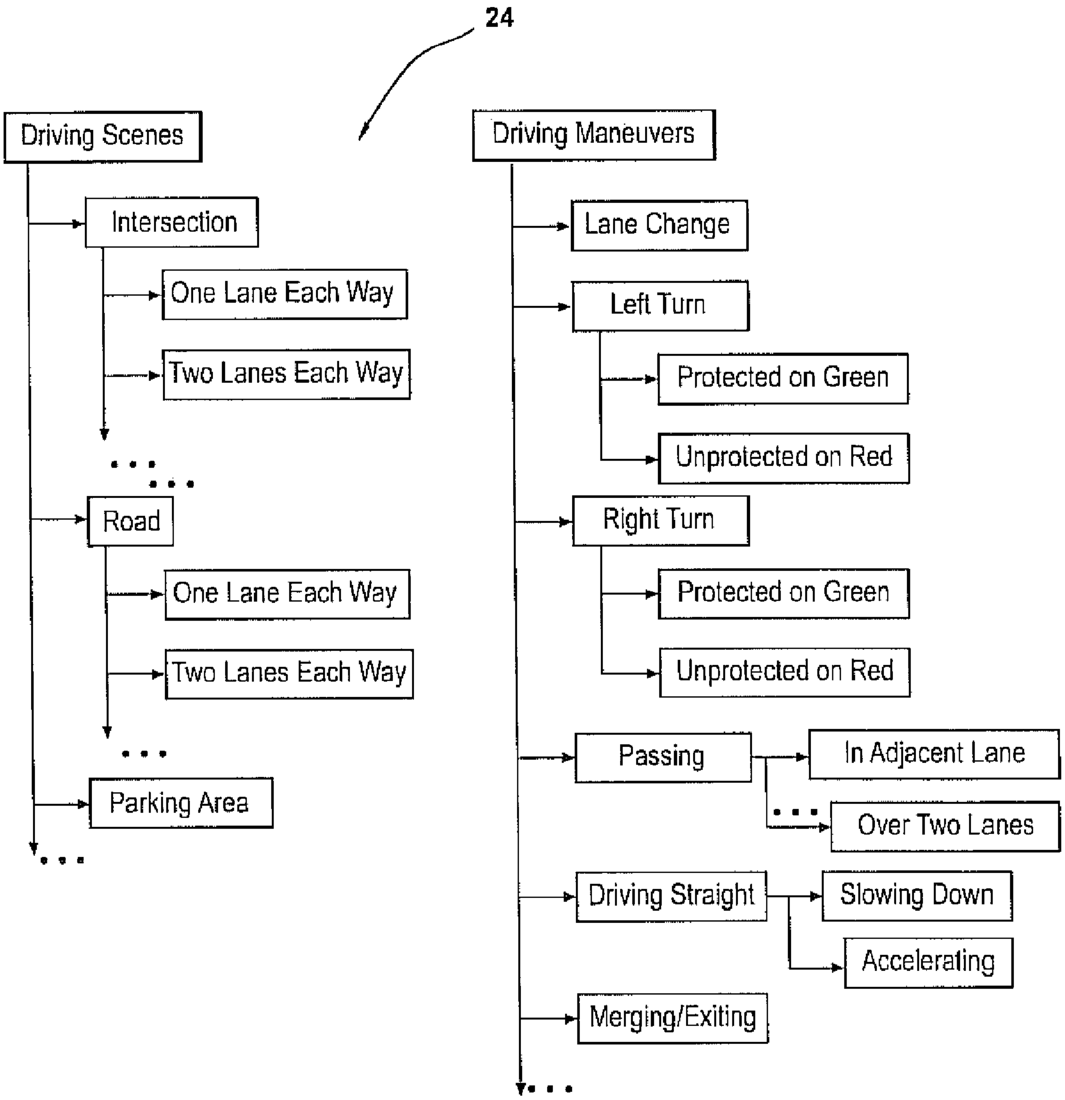
FIG. 3 is a diagram illustrating the elements of a hierarchical index.

With reference now to FIG. 3, an example of a hierarchical index 24 is provided. Specifically, the hierarchical index 24 shows passive driving conditions separated into two different categories: driving scenes and driving maneuvers. The driving scenes contain various driving environments, such as possible intersection, roadway and parking area configurations. The category of driving maneuvers contains data regarding various driving maneuvers as well as associated driving conditions, i.e. making a right turn on a red, or green light. Although two categories are shown, it is contemplated that passive driving conditions may be separated into other categories as well. Each passive driving condition is assigned a predetermined first risk factor, which may be binary or scaled.

Once the hierarchical index 24 is established, the next step in the method 12 is to identify the passive driving condition related to current vehicle operations. This saves processing time and provides for a more accurate driving risk assessment. The identification of the passive conditions may be done using on-board vehicle sensors and other devices such as a global positioning system 10. In operation, the global positioning system 10 will indicate to the operator where the host vehicle 20 is located and host vehicle 20 's current location is then used to identify the first risk factor of each applicable passive driving condition, namely street information such as path of the street, whether the street is historically busy at the time, historical information regarding pedestrian activity, any traffic lights in the path of the vehicle travel, and the like. For example, if the host vehicle 20 comes to an intersection, the host vehicle 20 is able to identify through the global positioning system 10 the location of the intersection and by reference to a database determine if a traffic light is at the intersection, the visibility at the intersection, the number of accidents at the intersection, and the like. The host vehicle 20 can then search the hierarchical index 24 for the passive driving conditions applicable to its current location, e.g. it is at an intersection, there is no traffic light. Thus the host vehicle 20 is going to make an unprotected turn—meaning there are no traffic signals to help protect a vehicle executing a turning maneuver. Accordingly, the identified passive driving condition along with its associated first risk factor is used to produce the driving risk assessment. On board sensors 14 may also be used to determine other passive driving condition related to vehicle operation. For instance, if the operator of the host vehicle 20 is at an intersection and desires to make a left turn, the associated risk factors of a left turn is identified when the driver operates his left turn signal, or makes a correction to the steering wheel indicating a left turn. Alternatively, if the correct identification of the driving maneuver is not possible, the risk factors of all possible maneuvers for the host vehicle 20 in the given situation can be computed with the purpose to advise the driver on the least risky maneuver. In reality, only a relatively modest number of possible maneuvers will have to be considered. For example, if another vehicle is in an adjacent lane very near the host vehicle 20, then the change-of-lane maneuver into the occupied lane may receive the highest risk factor, whereas the slow-down maneuver will receive the lowest risk if there is no vehicle behind the host vehicle 20.

Figure 4:
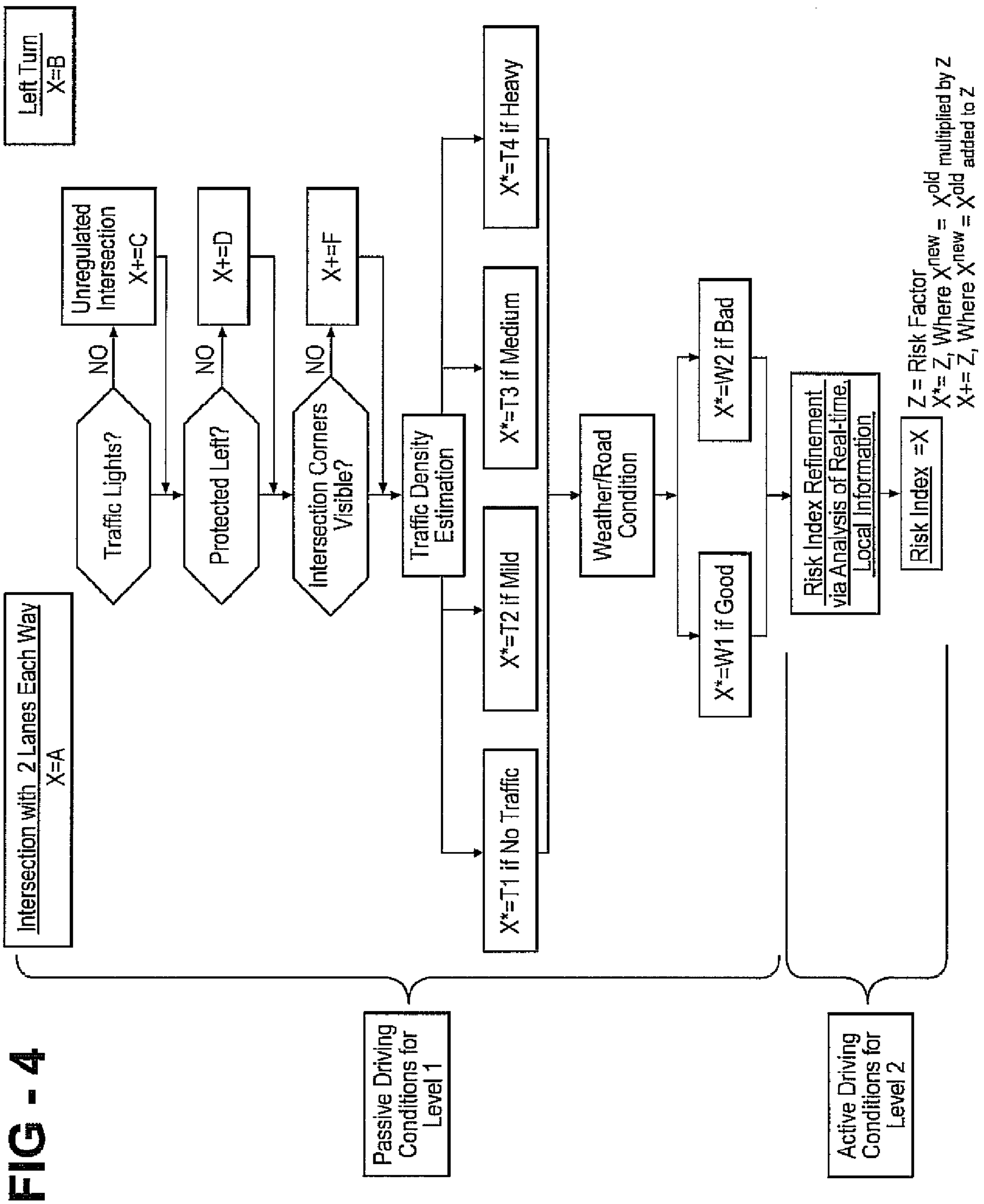
FIG. 4 is a flow diagram showing the operation of the method of providing driving risk assessment based upon a hierarchical index and active driving conditions.

With reference now to FIG. 4, the first risk factors associated with identified passive driving conditions of the hierarchical index 24 are summed together to provide a risk assessment of passive driving conditions. Specifically, the host vehicle 20 determines what the driving environment is with respect to the roadway orientation, and associated components such as traffic lights, signs, and the like. A predetermined query is made with respect to the driving scene and the intended driving maneuver, as shown in FIG. 4. The identified scene and maneuver are assigned a first risk factor of "A" and "B" for a two-lane intersection and a left turn, respectively. Additional passive driving conditions are assigned a risk factor which are added to the identified first risk factor components. FIG. 4 shows the absence of traffic lights as being assigned a risk factor of "C", an unprotected left turn being assigned a risk factor of "D", and poor visibility at the intersection corners being assigned a risk factor of "F". Thus the first risk factors identified from the hierarchical risk index are given a total first risk factor of the sum of "A," "B," "C," "D," and "F." Historical data, such as, the rate of accidents of the intersection, may be assigned a risk factor to further increase sum total of the identified first risk factors above. Real time data relating to the driving conditions may also be passive and affect the sum total of the identified first risk factors multiplicatively. Real time passive driving conditions as used herein refers to driving conditions which are currently present but are not controlled by any entity such as the level of traffic density or weather or road conditions, as shown in FIG. 4.

Once the first risk factors have been identified and processed, they are further refined by active driving conditions of the vehicle. The term refined or refinement as used herein refers to the adjustment of the first risk factors of the passive driving conditions with respect to the second risk factors of active conditions to generate a driving risk assessment. The term "active driving conditions" generally refers to moving objects such as pedestrians and vehicles. For instance, active driving conditions include real-time conditions outside of the host vehicle operator's control that may actively influence driving risk such as the driving maneuver of other vehicles, the movement of pedestrians, and other moving objects within a predetermined area of the host vehicle 20. Each of the identified active driving conditions are assigned a second risk factor. The second risk factors may be gathered from a vehicle-to-vehicle network 16, infrastructure-to-vehicle systems 10, or on-board vehicle sensors that can detect and track objects and provide information concerning detected objects such as the relative speed, direction, and size. The second risk factor is also influenced by the current projected path of the host vehicle 20. For instance, the greater the number of objects detected within a predetermined distance of the host vehicle 20, and the closer these objects are, and the faster they travel, the greater the driving risk is with respect to the first risk factor as the probability of mistakes made by other drivers is also increased.

Figure 5:
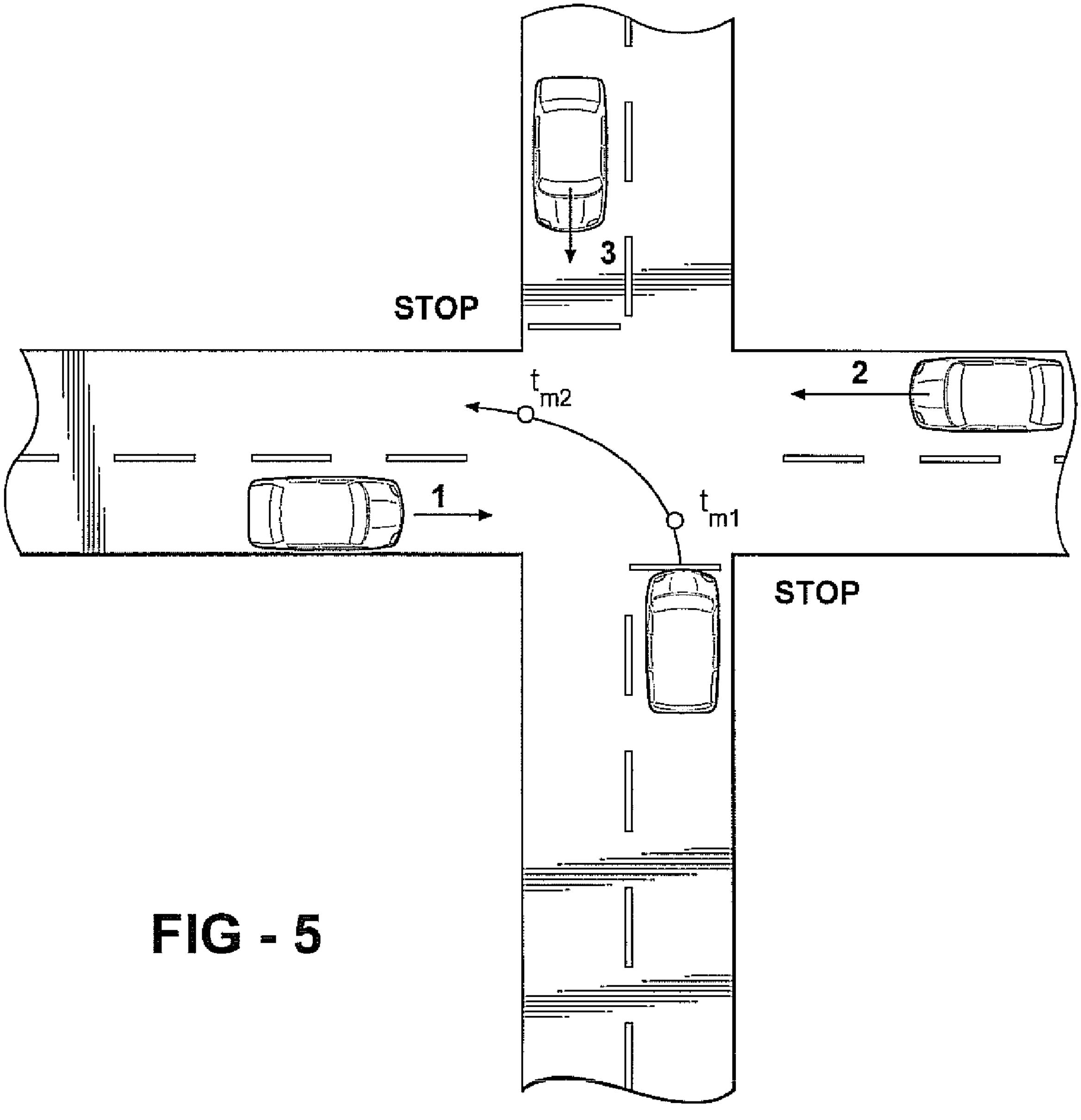
FIG. 5 is a perspective view of a scenario for use in explaining how the active driving conditions refine the passive driving conditions to generate a driving risk assessment.

With reference now to FIG. 5 a scenario is provided to illustrate how the system 10 refines passive driving conditions with active driving conditions to generate a driving risk assessment. In the scenario, the host vehicle 20 comes to a stop at a four-way intersection with vehicles 1, 2, and 3, and obtains information relating to passive and active driving conditions, such as the presence of a stop sign, how many lanes are in each roadway, the maneuvers of vehicles 1, 2, and 3. The information is provided through a V-2-V system, on-board sensors, I-2-V system, or a combination thereof. Suppose the host vehicle learns that vehicles 1 and 2 and are not required to stop, and the host vehicle 20 and vehicle 3 are required to stop. As stated above, the host vehicle 20 identifies and totals the first risk factors of passive driving conditions. In this case, the host vehicle 20 has identified that the host vehicle 20 is at a four way intersection, is required to stop, and the operator intends to make a left turn. The street scene may be known either through a global positioning system 10 limiting host vehicle 20 to the street scenes associated with the host vehicle 20 's current position or through a V-2-V or I-2-V system 10. The intended driving maneuver may be revealed by the driver turning on the left blinker. The total first risk factor for the current vehicle situation is made based upon all of the applicable passive driving conditions of the hierarchical index 24 discussed directly above, as well as historical data regarding the intersection, and the driver's intended maneuver, Specifically, first risk factors are totaled for passive driving conditions associated with the four-way intersection (street scene), the absence or presence of traffic signals (street scene components), historical data regarding the intersection, and a left turn maneuver. These first risk factors are summed and then multiplicatively affected by the weather and road conditions to provide a total first risk factor for the identified passive driving conditions of the hierarchical index 24. The host vehicle 20 then obtains active driving conditions, including information regarding other objects within a predetermined area of the host vehicle 20. The total first risk factor is then refined by any active driving conditions identified.

Information within the meaning of active driving conditions include whether an object is stopped or is supposed to stop. In FIG. 5, the host vehicle 20 detects three other vehicles within the predetermined area, and notes that vehicles "1" and "2" are not required to stop whereas the host vehicle 20 and vehicle "3" are required to stop. The host vehicle 20 refines the total of the first risk factors above by using information regarding the detected vehicles to determine a second risk factor. For instance, the host vehicle 20 computes the maneuver trajectory based on the known intersection orientation and dimension, i.e. lane size, lane markings, and the like. The host vehicle 20 then calculates possible arrival times $t_{m1}$ and $t_{m2}$ and speeds $v_{m1}$ and $v_{m2}$ at the points m1 and m2 ("1" in the subscript stands for the vehicle 1, and "2" stands for the vehicle 2). The host vehicle 20 then learns, from its on-board sensor 14 or vehicle-to-vehicle or infrastructure-to-vehicle network 18, that the intersection is currently free of obstruction as the host vehicle 20 only detects the three other objects within the predetermined area. However, the host vehicle 20 must predict whether vehicles "1" or "2" will arrive at points $t_{m1}$ and $t_{m2}$ when the host vehicle 20 is at the respective points. This may be done using on-board vehicle sensors, a vehicle-to-vehicle network 16, or an infrastructure-to-vehicle network 18. For example, the host vehicle 20 may ascertain through a vehicle-to-vehicle network 16 the speed and distance from points m1 and m2 of vehicles "1" and "2", and generate the minimum time and maximum time for the vehicles to arrive at m1 and m2, respectively. Specifically, the minimum and maximum observed speed of the vehicles and measured distance from said vehicles to respective points $t_{m1}$ and $t_{m2}$ can be used to generate the minimum and maximum expected time of vehicles "1" and "2" to reach respective points m1 and m2 by using the following equation: $t_{imin}=d_i/v_{imax}$;$t_{imax}=d_i/v_{imin}$ whereby $d_i$ is the distance from either vehicle "1" or "2" to the locations at $t_{m1}$ and $t_{m2}$, and $v_{imin}$ and $v_{imax}$ are the minimum and maximum speeds of the respective vehicles. The host vehicle 20 then determines if the left turn is safe by comparing the minimum and maximum estimated times for the vehicles to intersect with host vehicle 20 at $t_{m1}$ and $t_{m2}$ of the host vehicle 20 's path of maneuver. A safety gap may be provided to further assure the safety of the maneuver. The safety gap is dependent upon the speed of the vehicles at $t_{m1}$ and $t_{m2}$. Thus, if $t_{m1}+e<t_{1min}$ and $t_{m2}+e<t_{2min}$, where "e" represents the safety gap, and $v_{m2} \geqq v_{2max}$ the turn is deemed safe, otherwise, the turn is deemed unsafe. Though the illustration provided herein discloses the use of active driving conditions to produce a binary risk assessment, it is contemplated that the active driving conditions may be a scaled refinement of the identified first risk factors of the hierarchical index 24.

Obviously, many modifications and variations of the present invention are possible in light of the above teachings and may be practiced otherwise than as specifically described while within the scope of the appended claims. In addition, the reference numerals in the claims are merely for convenience and are not to be read in any way as limiting.

What is claimed is:

1. A system for providing driving risk assessment in a host vehicle operated by a vehicle operator, the driving risk assessment identify the degree of risk of the current operating condition, the system comprising:

a hierarchical index of passive driving conditions, the hierarchical index having a plurality of passive conditions, each of the plurality of passive conditions assigned a first risk factor, and the plurality of passive conditions arranged in order by value of first risk factor, wherein passive conditions are conditions not influenced by another driver, wherein each passive driving condition is assigned a first risk factor;

an active driving conditions identification system operable to detect moving objects within a predetermined distance of the host vehicle, wherein said system further providing characteristics of said objects such as speed, relative speed, distance, trajectory, and size, wherein said active driving conditions identification system assigning a second risk factor to each of each of said active driving conditions identified; and a processor for generating a driving risk assessment, said processor identifying each of said passive driving condition applicable to current driving conditions so as to determine a totality of first risk factors, the processor further operable to refine said identified passive driving conditions with the identified active driving conditions to provide a driving risk assessment for current host vehicle operation.

2. The system as set forth in claim 1 wherein said passive driving conditions include conditions selected from the group consisting of driving scenes, environmental conditions and intended driving maneuvers of the operator of the host vehicle.

3. A method for providing driving risk assessment to an operator of a host vehicle equipped with on-board sensors or vehicle-to-vehicle or infrastructure-to-vehicle systems, whereby said assessment may also be incorporated into an autonomously driven vehicle to provide for the safe operation thereof, said method comprising the steps of:

establishing a hierarchical index of passive driving conditions;

assigning a first risk factor to each passive driving condition, wherein passive conditions are conditions not influenced by another driver;

identifying each passive driving condition related to current vehicle operations;

identifying active driving conditions of the vehicle, wherein the active driving conditions are moving objects detected within a predetermined area of the host vehicle, and assigning a second risk factor to each active environmental conditions;

generating a driving risk assessment for current vehicle operation based upon each of the first risk factors of the identified passive driving conditions of the hierarchical index and the active driving conditions.

4. The method as set forth in claim 3 wherein the passive driving conditions include conditions selected from the group consisting of driving scenes, environmental conditions and intended driving maneuvers of the operator of the host vehicle.

5. The method as set forth in claim 3 wherein the active driving conditions include information gathered by the on-board sensors or provided by the vehicle-to-vehicle or infrastructure-to-vehicle systems relating to operating conditions of other vehicles or moving objects within a predetermined distance.

6. The method as set forth in claim 5 wherein further including the step of adding selected first risk factors together and then multiplying each of said selected first risk factors by the first risk factors associated with weather and road conditions.

7. The method as set forth in claim 6 wherein fuzzy logic is used to assign a risk factor to each of the known driving conditions.

8. The method as set forth in claim 7 wherein crisp logic is used to assign a risk factor to each of the known driving conditions.

9. The method as set forth in claim 6 wherein the risk driving assessment generated is binary.

10. The method as set forth in claim 9 wherein the risk driving assessment generated is scaled or gradual.

* * * * *